US009760709B2

(12) United States Patent
Lu et al.

(10) Patent No.: US 9,760,709 B2
(45) Date of Patent: Sep. 12, 2017

(54) AUTHENTICATION METHOD USING PHYSICAL UNCLONABLE FUNCTIONS

(71) Applicant: The Queen's University of Belfast, Belfast (GB)

(72) Inventors: Liang Lu, Hertfordshire (GB); Jiang Wu, Mississaugua (CA); Maire O'Neill, Belfast (GB)

(73) Assignee: The Queen's University of Belfast, Belfast (GB)

( * ) Notice: Subject to any disclaimer, the term of this patent is extended or adjusted under 35 U.S.C. 154(b) by 0 days.

(21) Appl. No.: 14/443,261

(22) PCT Filed: Nov. 13, 2013

(86) PCT No.: PCT/EP2013/073763
§ 371 (c)(1),
(2) Date: May 15, 2015

(87) PCT Pub. No.: WO2014/076151
PCT Pub. Date: May 22, 2014

(65) Prior Publication Data
US 2015/0278505 A1    Oct. 1, 2015

(30) Foreign Application Priority Data
Nov. 15, 2012    (GB) .................................. 1220574.6

(51) Int. Cl.
*G06F 21/44* (2013.01)
*H04L 9/08* (2006.01)
*H04L 9/32* (2006.01)

(52) U.S. Cl.
CPC ............ *G06F 21/44* (2013.01); *H04L 9/0866* (2013.01); *H04L 9/3278* (2013.01)

(58) Field of Classification Search
CPC .. G06F 21/44; G06F 21/31; G06F 2221/2129; H04L 9/32; H04L 9/3226;
(Continued)

(56) References Cited

U.S. PATENT DOCUMENTS 8,281,130 B2 * 10/2012 Hamada ................ H04L 9/3226
713/150
8,782,396 B2 * 7/2014 Ziola ....................... G06F 21/31
713/155

(Continued)

FOREIGN PATENT DOCUMENTS

WO    2009156904 A1    12/2009
WO    2010004335 A2    1/2010

OTHER PUBLICATIONS

Su, Y. et al., "A 1.6pJ/bit 96% stable chip ID generating circuit using process variations," Proceedings of International Solid State Circuits Conference 2007 (ISSCC 2007), Session 22, Diggital Circuit Innovations, 22.5, Feb. 14, 2007, 3 pages.

(Continued)

*Primary Examiner* — Thanhnga B Truong
(74) *Attorney, Agent, or Firm* — Withrow & Terranova, P.L.L.C.

(57) ABSTRACT

A method of authenticating a target device using a reader and a data store comprising: sending a selected challenge data value from the reader to the target device multiple times; receiving at the reader the respective response data value generated by the target device in response to each instance of the challenge data value sent by the reader; determining a representative response data value from the response data values received by the reader; comparing the representative response data value against the response data values in the respective challenge-response data set; and determining that the target device is authentic if the repre- (Continued)

sentative data value matches any one of the response data values from a respective challenge-response data set.

12 Claims, 4 Drawing Sheets

(58) Field of Classification Search
CPC ... H04L 9/3271; H04L 9/0866; H04L 9/3278; H04L 2209/12; H04L 2209/805
USPC .......................... 726/19; 713/150, 168, 155
See application file for complete search history.

(56) References Cited

U.S. PATENT DOCUMENTS

2009/0083833 A1    3/2009   Ziola et al.
2010/0250936 A1    9/2010   Kusakawa et al.

OTHER PUBLICATIONS

International Search Report for International Patent Application No. PCT/EP2013/073763, dated Mar. 28, 2014, 3 pages.
International Preliminary Report on Patentability for International Patent Application No. PCT/EP2013/073763, dated May 19, 2015, 8 pages.

* cited by examiner

```
REGISTRATION:
for each PUF
    establish a record R
    for i from1 to nID                          ⎫
        send system constant c to PUF           ⎬ S1
        receive response and store as R.id[i]   ⎭
    end for for iCR from 1 to nCR                       ⎫
        generate a random challenge x           ⎪
        store x in R.cr[iCR].x                  ⎪
        for iR from 1 to nR                     ⎬ S2
            send x to PUF                       ⎪
            receive y from PUF                  ⎪
            store y in R.cr[iCR].y[iR]          ⎭
        end for
    end for
end for
```

Fig. 4

```
IDENTIFICATION:
for i from 1 to nID
    send system constant c to PUF
    receive response as id'
    if find a match R where R.id[i] = id' for any i, then  ⎫
        goto AUTHENTICATION                                 ⎬ S3
    end if                                                  ⎪
end for                                                     ⎭
reject and stop AUTHENTICATION:
select R.cr[i] for any i
set x = R.cr[i]
for iQ from 1 to nQ                                         ⎫
    send x to PUF                                           ⎪
    receive y' from PUF                                     ⎬ S4
    update maj_y'                                           ⎪
end for                                                     ⎭
if maj_y' = R.cr[i].y[j] for any j                          ⎫
    accept PUF                                              ⎪
    remove R.cr[i] from database                            ⎪
else                                                        ⎬ S5
    reject PUF                                              ⎪
    remove R.cr[i] from database                            ⎪
end if                                                      ⎭
```

Fig. 5

AUTHENTICATION METHOD USING PHYSICAL UNCLONABLE FUNCTIONS

This application is a 35 USC 371 National Phase filing of PCT/EP2013/073763, filed Nov. 13, 2013, which claims priority to UK patent application 1220574.6 filed Nov. 15, 2012, the disclosures of which are incorporated herein by reference in their entireties.

FIELD OF THE INVENTION

The present invention relates to authentication using Physical Unclonable Functions (PUFs).

BACKGROUND TO THE INVENTION

An important aspect of improving the trust-worthiness of semi-conductor devices, and semi-conductor based systems is enhancing their physical security. In particular there is a demand for semi-conductor devices to be resistant not only to computational attacks but also to physical attacks such as reverse engineering. Physical Unclonable Functions (PUFs) are able to generate signatures based on device manufacturing variations that are infeasible to control or reproduce. Ideally, every PUF can generate a unique output for a fixed given input and so provides a means of authentication that can be used in many security, protection, and digital rights management applications.

Authentication using PUFs typically involves a challenge-response cycle. Protocols have been devised that reduce the likelihood of false negative determinations being made during challenge-response authentication. However, false positive determinations are an increasing problem.

It would be desirable therefore to provide an improved PUF authentication method.

SUMMARY OF THE INVENTION

A first aspect of the invention provides a method of authenticating a target device using a reader and a data store, the reader being configured to send challenge data values to the target device, the target device being configured to generate a response data value in response to receiving said challenge data value, the data store comprising a plurality of challenge-response data sets, each challenge-response data set comprising a challenge data value and a plurality of corresponding response data values, the method comprising:

sending a selected challenge data value from said reader to said target device multiple times;

receiving at said reader the respective response data value generated by said target device in response to each instance of said challenge data value sent by said reader;

determining a representative response data value from the response data values received by said reader;

comparing said representative response data value against said response data values in the respective challenge-response data set; and determining that said target device is authentic if said representative data value matches any one of said response data values from said respective challenge-response data set.

A second aspect of the invention provides a reader for authenticating a target device using a data store, the reader being configured to send challenge data values to the target device, the target device being configured to generate a response data value in response to receiving said challenge data value, the data store comprising a plurality of challenge-response data sets, each challenge-response data set comprising a challenge data value and a plurality of corresponding response data values, the reader comprising means for sending a selected challenge data value to said target device multiple times; means for receiving the respective response data value generated by said target device in response to each instance of said challenge data value sent by said reader; means for determining a representative response data value from the received response data values; means for comparing said representative response data value against said response data values in the respective challenge-response data set; and means for determining that said target device is authentic if said representative data value matches any one of said response data values from said respective challenge-response data set.

A third aspect of the invention provides an authentication system comprising a target device, a reader and a data store, the reader being configured to send challenge data values to the target device, the target device being configured to generate a response data value in response to receiving said challenge data value, the data store comprising a plurality of challenge-response data sets, each challenge-response data set comprising a challenge data value and a plurality of corresponding response data values, the reader comprising means for sending a selected challenge data value to said target device multiple times; means for receiving the respective response data value generated by said target device in response to each instance of said challenge data value sent by said reader; means for determining a representative response data value from the received response data values; means for comparing said representative response data value against said response data values in the respective challenge-response data set; and means for determining that said target device is authentic if said representative data value matches any one of said response data values from said respective challenge-response data set.

Preferred features of the invention are recited in the dependent claims.

Further advantageous aspects of the invention will become apparent to those ordinarily skilled in the art upon review of the following description of a specific embodiment and with reference to the accompanying drawings.

BRIEF DESCRIPTION OF THE DRAWINGS

An embodiment of the invention is now described by way of example and with reference to the accompanying drawings in which.

DETAILED DESCRIPTION OF THE DRAWINGS

A Physical Unclonable Funtion (PUF) is a function that is embodied in a physical structure such that when a physical stimulus is applied to the PUF it reacts unpredictably due to the interaction between the stimulus and the physical structure. This is a result of unpredictable physical characteristics being introduced into the physical structure of the PUF during manufacture. The physical stimulus is typically referred to as a challenge and the reaction of the PUF is referred to as a response. A challenge and its respective response are called a challenge-response pair (C/R PAIR).

PUFs can be implemented to extract the physical properties of a variety of physical systems. For example, it is possible to implement PUFs in integrated circuits (ICs). Silicon or other semi-conductor PUFs can be fabricated using, for example, existing ASIC fabrication processes and therefore can easily interface with ICs or can be built on the same die as other IC-based components. PUFs exploit uncontrollable process variations that occur during the fabrication of ICs. These variations make it impossible to manufacture any two identical devices with identical physical characteristics.

A variety of semiconductor, in particular silicon, PUF implementations are known, including those categorized as delay-based PUFs and memory-based PUFs. Delay-based PUFs typically use variations in the propagation delay of identical circuits to derive a unique and secret response from the IC. A number of different architectures may be used including Ring Oscillator PUFs, Arbiter PUFs and Tristate Buffer PUFs. Memory-based PUFs, which for example include SRAM PUFs and Butterfly PUFs, depend upon the unpredictable startup state of feedback based CMOS memory structures to produce a secret response. Most CMOS based memory structures including flip-flops, SRAMs and latches, use a cross-coupled structure with a positive feedback to store the required logic.

Figure 1:
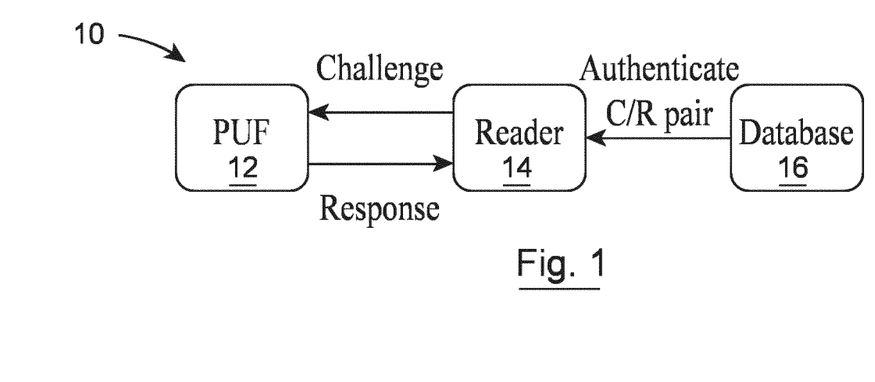
FIG. 1 is a schematic diagram of a PUF authentication system.

Referring now to FIG. 1 of the drawings there is shown, generally indicated as 10, a PUF based authentication system embodying one aspect of the invention. The system 10 comprises a PUF device 12, a reader 14 and a data store 16. The PUF device 12, which may be referred to as a silicon, or semiconductor, PUF, comprises an IC that performs as a pseudo-random function. The PUF is included in a target device whose authenticity it is desired to verify.

The PUF 12 and the reader 14 communicate with each other in accordance with an authentication protocol. During authentication of the PUF 12, the PUF 12 receives an input data value C (the "challenge") from the reader 14 and returns an unpredictable output data value R (the "response"). Due to manufacturing variations, the physical structure of each PUF 12 is unique such that it implements a respective pseudo-random function. Hence, the response generated by the PUF 12 is dependent on its physical characteristics and, more particularly, on one or more physical characteristics that result from its manufacturing process. The data store 16, which typically comprises a database, holds data representing a plurality of challenges and their corresponding responses (in respective challenge-response data sets referred to hereinafter as challenge-response pairs (C/R pairs)) for the or each PUF 12 supported by the system 10. This data can be gathered empirically during a registration phase and subsequently used to authenticate the PUF 12, or other article with which the PUF 12 is associated. For example, the PUF 12 may be incorporated into product packaging to allow authentication of the product. In FIG. 1, only one PUF 12 is shown. In practice the system 10 may include a plurality of PUFs in that the reader 14 and database 16 may be used in the authentication of a plurality of PUFs, each of which for example is incorporated into respective packaging or other article.

In embodiments of the invention, any convenient type of silicon or semiconductor PUF device may be used. In the present example it is assumed that the PUF device 12 comprises a cross-coupled ring based PUF, that utilizes threshold voltage variation in the transistors.

Figure 2:
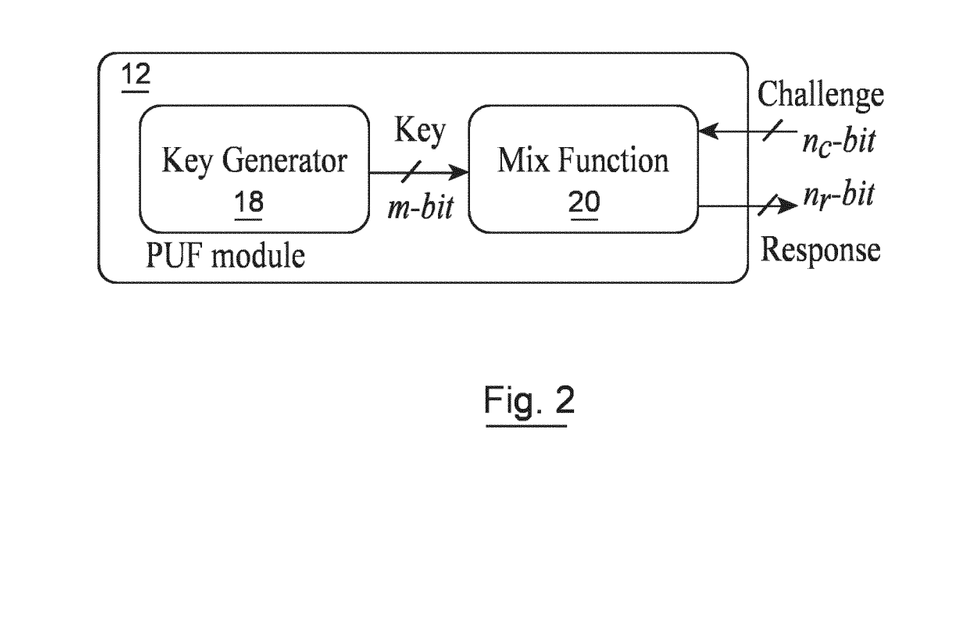
FIG. 2 is a schematic diagram of a PUF device included in the system of FIG. 1.

FIG. 2 illustrates a typical embodiment of the PUF 12 in more detail. The PUF 12 comprises a key generator component 18 and a mix function component 20. The key generator 18 is configured to create a unique m-bit message, or key, based on one or more parameter variations generated during the manufacturing of the IC that embodies the PUF 12. By way of example, the variable parameters may include any one or more of threshold voltages of transistors, delay differences of components (e.g. wires or gates), IR drop, voltage drop). During use, the key generator 18 provides the unique key to the mix function 20. The mix function 20 is adapted to receive challenges from the reader 14 ($n_c$-bit challenges in this example). Using the key, the mix function 20 is configured to generate a respective $n_r$-bit response for each challenge. The PUF 12 sends the response back to the reader 14. Typically, parameters m, $n_c$, and $n_r$ are positive integers, the size of which may vary from application to application to meet, for example, constraints relating to silicon area cost, power consumption and/or speed. As is described in more detail below. The reader 14 obtains each challenge from the data store 16 as part of a challenge-response pair (C/R pair). In respect of each challenge, the reader 14 is configured to determine if the response received from the PUF 12 matches the response of the respective C/R pair.

The key generator 18 may be implemented in any convenient conventional manner. For example it may comprise a respective bit generator for producing a respective one bit of the m-bit key. Any suitable conventional architecture for the bit generators may be used, for example a NOR-gate bit generator as disclosed by Y. Su, J. Holleman and B. Otis, "A 1.6 pJ/bit 96% stable chip ID generating circuit using process variations", in Proceedings of International Solid State Circuits Conference 2007. Ideally, the bit generators are configured to produce a stable bit output, i.e. reliably a "1" or a "0", since this results in a stable key being generated.

It is noted that in alternative embodiments, a PUF having a different architecture to the one shown in FIG. 2 may be used. For example, some PUF devices have an inherent challenge response mechanism and do not require a mix function. In general, PUFs suitable for use with the present invention include challenge-response means configured to generate a response in response to receiving a challenge.

In practice, bit generators or other key generators tend not to produce completely stable bit outputs, e.g. the intended output may be produced with more than, say, 95% reliability but less than 100% reliability. Unstable bits deteriorate the reliability of keys produced by the key generators. This increases the possibility of the reader 14 making a false positive or false negative determination when verifying a PUF response against a C/R pair.

One option for achieving a more reliable key is to provide a post-processing module (not shown) for removing or reducing unstable effects. The post-processing module typically takes the form of an IC and is typically located with the PUF. However, such a module requires additional resources and increases the area cost of the PUF chip. It is desirable therefore to provide alternative means for reducing the chance of false negatives or false positives being determined, as is described in further detail hereinafter.

The unique key produced by the key generator 18 serves as a unique identifier (ID) for the PUF 12 and is determined by one or more physical characteristics resulting from the manufacturing process of the IC by which the PUF 12 is embodied. However, direct use of the key as an ID would be susceptible to hacking. The mix function 20 protects the key from public exposure. The mix function 20 is typically configured to perform a mathematical function f on an input x using the key k to produce an output y ($y=f_k(x)$). Hence, the mix function 20 behaves as a pseudorandom function: without knowing k, it is infeasible to predict y.

The mix function 20 can be implemented using any block cipher, stream cipher, or algorithm that can behave as a pseudorandom function. When a block cipher is used, x is the plaintext, k is the encryption key, and y is the ciphertext. When a stream cipher is used, x is the initial vector, k is the initial key, and y is the first few bits (the length is pre-defined in the application) of the key stream generated by the cipher. A block cipher and a stream cipher offer stronger security than is required from the mix function. A block cipher involves a one-way permutation that is reversible, while the mix function only needs to be a one-way function but does not necessarily need to be reversible. A stream cipher needs to produce a long pseudorandom bit string (e.g. 230 bits), while the mix function is typically only required to produce a short pseudorandom bit string (e.g. 64 bits). Therefore, a dedicated function f, or algorithm, may be used by the mix function 20 that is more efficient than conventional block ciphers and stream ciphers.

In the authentication system 10, the challenge may be used as the input x of the mix function 20, the key k being the key produced by the generator 18 and the response being the output y. Due to the uniqueness of the key produced by the generator 18, each PUF 12 can produce a different response in response to the same challenge. Therefore, C/R pairs can be used as IDs for each PUF or IC embodying same. Instead of using the key directly, the different C/R pairs are used for authentication purposes.

The system 10 supports an authentication protocol that determines and coordinates the behaviors of the PUF 12, reader 14 and database 16 in order to complete a verification process. In addition to an authentication phase, the preferred protocol includes a registration phase and, preferably also, an identification phase.

In the registration phase, the reader 14 records the C/R pairs generated by the or each PUF 12 supported by the system 10. This is achieved by sending challenges to the PUF 12 from the reader 14 and recording the respective responses ($y=f_k(x)$). The registration phase is typically performed before the article (e.g. packaging or labeling) with which the PUF is associated is distributed commercially. In the authentication phase, the reader 14 sends at least one challenge (x) recorded in the database 16 to the PUF 12, and the PUF computes $y=f_k(x)$ on-the-fly and returns y as a response to the reader 14, y and x making a C/R pair. The reader 14 checks the C/R pair against the database 16. The PUF 12 may be accepted as genuine or rejected as a counterfeit depending on whether the reader 16 can find a match for the C/R pair in the database 16.

A single check of a C/R pair may be used in the authentication phase. However, the reliability of such a simple protocol is dependant on the ability of the key generator 18 in PUF 12 to generate a stable key. In typical cases where one or more of the bits generated by the key generator 18 are not stable, the chances of obtaining a false negative or false positive C/R pair match increases. Although post-processing methods can improve the stability of keys, in practice the key still tends not to be completely stable. Advantageously therefore the authentication protocol is configured to reduce the negative impact of any unstable bits in the key during the authentication process.

In typical embodiments, the key k is generated by the key generator 18 each time the PUF 12 is challenged. As a result of unstable bit generation, the value, or bit composition, of k may vary from challenge to challenge. The number of unstable bits is typically finite and therefore the total number of different key values that can be produced by the PUF 12 is also finite. For example, in cases where the key generator 18 comprises e unstable bit generators, the number of different keys is at most $2^e$. So for an 80-bit key where on average there are 2 unstable bits, the maximum number of different keys is 4. Based on such analysis, the authentication protocol is advantageously configured to use a limited number of repetitions of C/R pair checks to reduce or eliminate errors arising from bit instability. The number of repetitions may be determined by the size of the key and the (estimated or calculated) number of unstable bits (which itself may depend on the configuration of the key generator 18).

Figure 3:
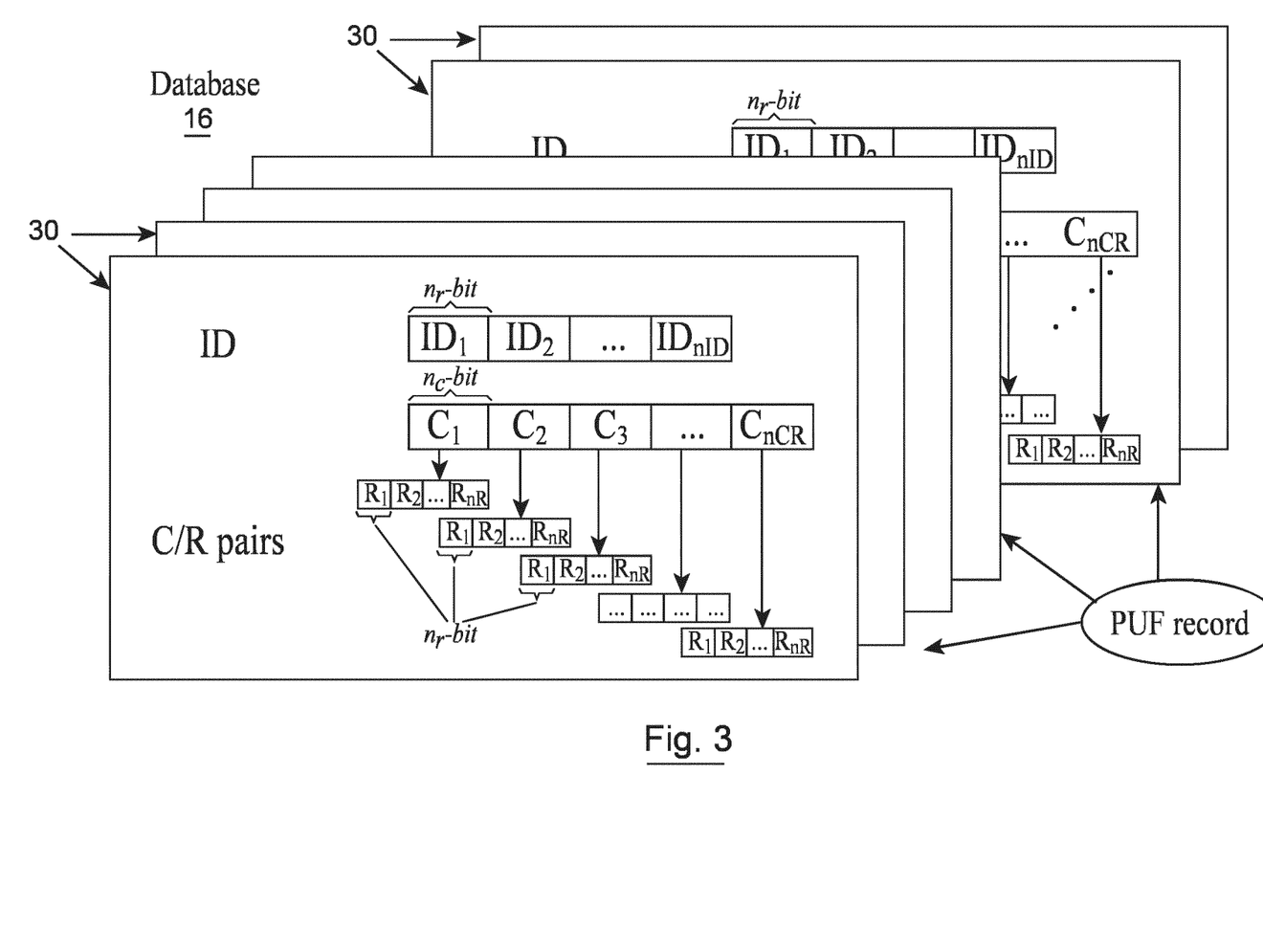
FIG. 3 is a schematic representation of PUF information suitable for use in a preferred authentication method.

Referring now to FIG. 3, in preferred embodiments, the reader 14 maintains a record 30 in the database 16 in respect of the, or each, PUF 12 with which it is used. Each record 30 comprises a PUF identifier (ID) and a plurality of C/R pairs (challenge-response data sets). The ID is an intrinsic identification of the respective PUF 12. During the registration phase, the reader 14 sends a dedicated $n_c$-bit identification challenge to the PUF 12 and records the response as the ID. Before the authentication phase, an identification phase is preferably implemented in which the ID is computed and provided by the PUF 12 as an on-the-fly response to the dedicated $n_c$-bit identification challenge from the reader 14. To accommodate the possibility of different IDs being generated by the PUF as a result of unstable bits, during the registration phase, a plurality of $n_r$-bit IDs, nID, are computed and stored in the database 16 (where "n" denotes any number such that the length $n_r$ of the IDs is not necessarily the same as the number n of IDs). For the same reason, during the identification phase, the identification challenge-response cycle is preferably repeated a plurality of times. The number of IDs computed and stored for each PUF, and usually also the number of challenge-response repetitions in the registration phase, are typically determined by the size of the ID and the (estimated or calculated) number of unstable bits (which itself may depend on the configuration of the key generator 18). In preferred embodiments, the number of IDs stored for a PUF is the same as the number of responses to a same challenge, since the ID is generated by the same key generator and so unstable bits could be present in the ID. The number of challenges may depend on the application.

In embodiments where the reader 14 is used with only one PUF 12, the PUF identifiers and identification phase may be omitted.

In addition, during the registration phase a plurality of C/R pairs, nCR, are pre-calculated and stored in the database 16 for each PUF 12. In the preferred embodiment, for each PUF 12 each C/R pair comprises an $n_c$-bit challenge and a respective plurality of corresponding $n_r$-bit responses, nR. Multiple different responses to each challenge are caused by unstable bits generated by the key generator. Typically, during registration, each challenge is sent to the PUF a plurality of times, preferably a selected number of times that is statistically likely to produce all of the different responses, and the respective response is recorded. The same procedure may be followed when recording the IDs during registration. For the same reason, during the authentication phase, the authentication challenge-response cycle is preferably repeated a plurality of times—it is particularly advantageous that the same challenge is sent multiple times and the respective responses recorded. Hence, in the authentication phase, each C/R pair comprises an $n_c$-bit challenge and a respective plurality of corresponding $n_r$-bit responses, nR. The number of responses computed for each challenge is typically determined by the size of the key and the (estimated or calculated) number of unstable bits (which itself may depend on the configuration of the key generator 18). In preferred embodiments, responses are not stored during authentication. Instead, they are compared with the stored C/R pairs. The number of times that a challenge is sent may be empirical. Sending a challenge multiple times reduces the chance of false negatives occurring. During authentication, more than one different challenge may be sent to the PUF 12, but it is preferred that each challenge is sent multiple times as described above.

Figure 4:
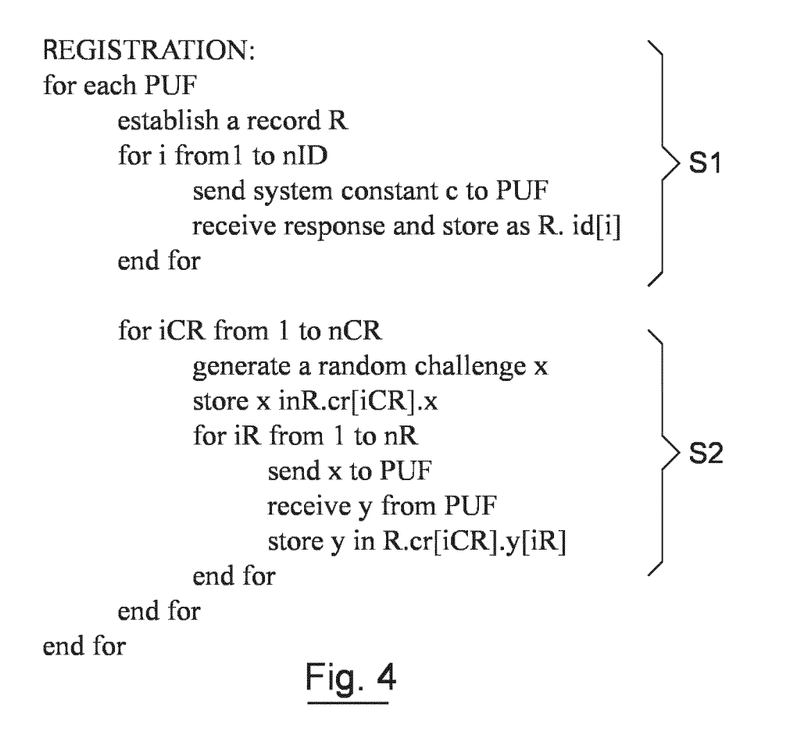
FIG. 4 is pseudo-code illustrating an example of a registration process suitable for use in the preferred authentication method.

Referring now to the pseudo-code presented in FIG. 4 an embodiment of the registration phase is described. A record R is established for each PUF. In segment 51, the record R is populated with the ID data for the respective PUF, the ID data comprising a plurality (n) of responses R.id[i], each response being generated by the PUF in response to being challenged with the same dedicated identification challenge c. The challenge c may for example comprise any constant value, e.g. c=1. This constant challenge c is preferably used both in the registration and the authentication processes to generate the ID and C/R pairs. In segment S2, for each C/R pair (iCR) of each PUF a respective challenge x is selected and stored in the record R as part (R.cr[iCR].x) of the respective C/R pair. The challenge x is sent to the PUF a plurality (n) of times and the respective responses (y) are stored in the record R as multiple responses (R.cr[iCR].y[iR]) of the respective C/R pair.

The preferred authentication phase comprises identification and authentication. Identification tells the reader 14 which PUF 12 is being queried, and authentication ensures the authenticity of the PUF 12. An embodiment of the authentication phase is now described with reference to FIG. 5. Section S3 describes the identification process: the identification challenge c is sent to the PUF a plurality (n) of times and the respective responses (id') are each checked against the ID data (R.id[i]) in record R for the respective PUF. If a match is found then the reader 14 proceeds to the authentication process, otherwise the authentication phase is terminated. Sections S4 and S5 describe the authentication process. In section S4 a challenge is selected from the record R for the PUF (x=R.cr[i]) and is sent by the reader 14 to the PUF multiple times. The responses received from the PUF are used to determine a response that is representative of the received responses, e.g. a majority response. In this example, each response (y') received from the PUF is used to update a majority response indicator (maj_y') such that maj_y' comprises the response received most frequently from the PUF. Selecting a majority response may be performed in any convenient manner. In section S5, the majority response (maj_y') is compared against the responses stored in the record R in association with the selected challenge. If a match is found, the PUF is accepted as authentic, otherwise the PUF is rejected as inauthentic. Preferably, after a selected challenge has been used in the authentication process, it is removed from the record R.

In the foregoing descriptions, it will be understood that the value of the parameter n need not be the same for the various operations described.

Figure 5:
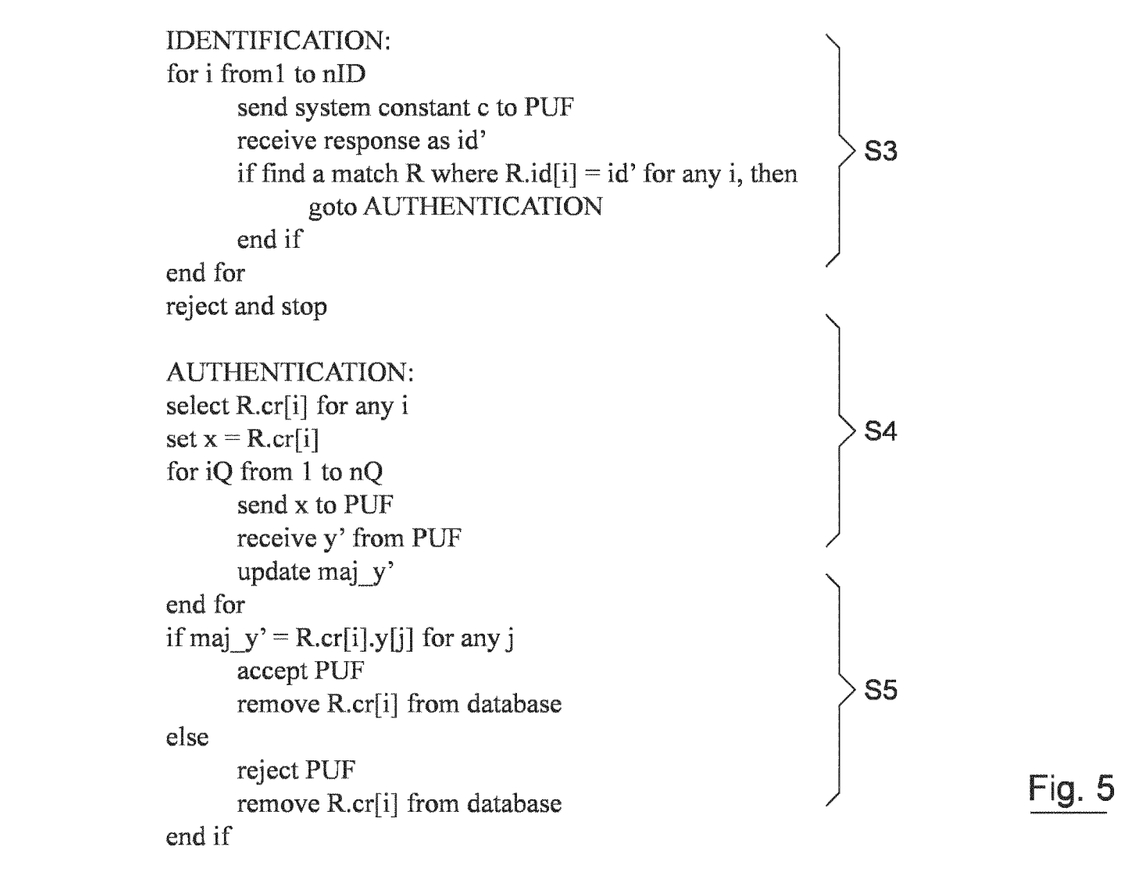
FIG. 5 is pseudo-code illustrating an example of an identification and authentication process suitable for use in the preferred authentication method.

As can be seen from the example of FIG. 5, a multiple-query strategy is applied in the authentication process. First of all, in the identification process, a constant challenge c is sent a multiple of times to ensure a valid PUF is not rejected due to any unstable bits affecting the key. Similarly, in the authentication process, a number of queries with the same challenge are sent to the PUF and a number of corresponding responses are obtained. The majority (or other representative response) of these responses is recorded and looked up along with the challenge in the database 16 to verify the authenticity of the PUF. This multiple-query method can reduce the possibility of a false negative determination being made. It is possible to completely eliminate the chance of false negatives by increasing the number of queries. The preferred multiple-query strategy also reduces the chance of a false positive determination being made.

Once the authentication process is complete, the C/R pair that has been used for verification is preferably removed to prevent a third party from acquiring this information to forge a system with the same C/R pairs.

In some embodiments, the system 10 may be incorporated into an RFID system having an architecture similar to that shown in FIG. 1 wherein the, or each, PUF 12 is incorporated into a respective RFID tag and the reader 14 comprises an RFID reader. The reader can query any RFID tags support by the system and have access to the database 16. Each tag includes a PUF device such that the tag is equipped with an unclonable identification means. In use, the authentication protocol proves the authenticity of a tag to the reader.

By way of example, 64-bit challenges and responses can be used. The key generator may for example produce an 80-bit key. For example, a modified GRAIN stream cipher may be used by the mix function 20. It receives a 64-bit challenge along with an 80-bit key and generates its first 64 bits as the response. For the authentication protocol, nQ=2 and nR=10 are sufficient to eliminate the unstable key bits to have a reliable unclonable system. These numbers can be reduced if a post-processing module is employed.

The invention is not limited to the embodiments described herein which may be modified or varied without departing from the scope of the invention.

The invention claimed is:

1. A method of authenticating a target device using a reader and a data store, the reader being configured to send a challenge data values to the target device, the target device being configured to generate a response data value in response to receiving said challenge data value, wherein the response data value sent by said target device is determined by one or more physical characteristics of the target device that result from manufacturing of said target device, and wherein the data store comprises a plurality of challenge-response data sets, each challenge-response data set comprising a challenge data value and a plurality of corresponding response data values, the method comprising:

sending multiple times the respective challenge data value from a selected one of said plurality of challenge-response data sets from said reader to said target device;

receiving at said reader the respective response data value generated by said target device in response to each instance of said respective challenge data value sent by said reader;

determining a representative response data value from said response data values received by said reader in response to said instances of said respective challenge data value sent by said reader;

comparing said representative response data value against said response data values in said selected challenge-response data set; and determining that said target device is authentic if said representative data value matches any one of said response data values from said selected challenge-response data set.

2. A method as claimed in claim 1, further including determining said representative response data value as the response data value most commonly received by said reader in response to said instances of said respective challenge data value sent by said reader.

3. A method as claimed in claim 2, further including, in a registration phase, sending each of a plurality of challenge data values to said target device multiple times; receiving at said reader the respective response data value generated by said target device in response to each instance of each challenge data value sent by said reader; and recording each challenge data value in association with the respective response data values in a respective one of said challenge-response data sets.

4. A method as claimed in claim 1, wherein said target device comprises a physical unclonable function (PUF) device.

5. A method as claimed in claim 1, further including generating at said target device a pseudo-random response data value in response to receiving said challenge data value.

6. A method as claimed in claim 1, wherein a plurality of different selected challenge data values are each sent from said reader to said target device multiple times.

7. A method as claimed in claim 1, further including, in an identification phase, sending an identification challenge data value to said target device; receiving at said reader an identification response data value generated by said target device in response to said identification challenge data value sent by said reader; comparing said identification response data value against a respective identification response data value associated with each challenge-response data set; and selecting the challenge-response data set associated with the identification response data value that matches said identification response data value generated by said target device.

8. A method as claimed in claim 7, further including performing said identification phase before said authentication, and using said selected challenge-response data set in said authentication.

9. A method as claimed in claim 7, further including sending said identification challenge data value to said target device multiple times.

10. A method as claimed in claim 3, further including, during said registration phase, sending an identification challenge data value to said target device; receiving at said reader an identification response data value generated by said target device in response to said identification challenge data value sent by said reader; storing said identification response data value in association with a respective one of said challenge-response data sets associated with said target device.

11. A method as claimed in claim 1, further including determining the number of times to send a challenge data value to said target device depending on the number of unstable bits in the response data value generated by the target device.

12. A reader for authenticating a target device using a data store, the reader being configured to send challenge data values to the target device, the target device being configured to generate a response data value in response to receiving said challenge data value, wherein the response data value sent by said target device is determined by one or more physical characteristics of the target device that result from the manufacturing of said target device, and wherein the data store comprises a plurality of challenge-response data sets, each challenge-response data set comprising a challenge data value and a plurality of corresponding response data values, the reader comprising means for sending multiple times the respective challenge data value from a selected one of said plurality of challenge-response data sets to said target device; means for receiving the respective response data value generated by said target device in response to each instance of said respective challenge data value sent by said reader; means for determining a representative response data value from the response data values received in response to said instances of said respective challenge data value sent by said reader; means for comparing said representative response data value against said response data values in said selected challenge-response data set; and means for determining that said target device is authentic if said representative data value matches any one of said response data values from said selected challenge-response data set.

* * * * *

UNITED STATES PATENT AND TRADEMARK OFFICE
CERTIFICATE OF CORRECTION

PATENT NO. : 9,760,709 B2
APPLICATION NO. : 14/443261
DATED : September 12, 2017
INVENTOR(S) : Liang Lu et al.

It is certified that error appears in the above-identified patent and that said Letters Patent is hereby corrected as shown below:

In the Specification

In Column 7, Line 19, replace "In segment 51" with --In segment S1--.

In the Claims

In Column 8, Line 43, replace "challenge data values" with --challenge data value--.

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*